2,965,657
PHOSPHORATED OILS

Thomas W. Findley, La Grange, Ill., assignor to Swift & Company, Chicago, Ill., a corporation of Illinois No Drawing. Filed June 4, 1956, Ser. No. 595,559

8 Claims. (Cl. 260—403)

This invention in general relates to phosphorated oils and to processes for esterifying animal, marine, and vegetable oils with phosphorus acids.

Sulfated oils are comparatively easily prepared by simply reacting concentrated sulfuric acid with unsaturated oils. Unlike sulfated oils, phosphated oils are more difficult to prepare and are not made by simply reacting phosphoric acid directly with an unsaturated oil. One known method for preparing phosphated triglycerides is the reaction of phosphoric anhydride with castor oil, which contains a substantial portion of ricinoleic acid, the mono-hydroxy group of said acid being esterified by the phosphoric anhydride. This process is limited to one fatty oil and to one phosphorated triglyceride composition as the end product with the phosphate ester always in the 12 position.

The process of this invention on the other hand involves the reaction of epoxidized fatty oils with polybasic phosphorus acids to produce phosphorated oils. One method for preparation of phosphorated oils involves the use of a mutual solvent, where required, for the phosphorus acids and the epoxidized oil. Solvents which have been found effective are tetrahydrofuran, dimethyl ether, dioxane, acetone, and alkanols such as ethanol. The phosphorus acids are dissolved in the solvent, and the epoxidized oil is then added to the solution slowly and with good stirring. In cases where the acid is dispersible or soluble in the epoxidized oil, as is the case with monoalkyl phosphoric acids such as mono-propyl and mono-butyl phosphoric acids, the acid and oil can be mixed directly. The addition of the epoxidized oil is controlled so that the heat of the reaction does not cause the solvent to boil off. After all of the epoxidized oil is added, the solvent is boiled off by heating the reactants and products. The hydroxylated phosphorated triglyceride is recovered as an un-neutralized, viscous oil and is water washed to remove excess phosphorus acid. The water soluble alkali metal salt may be formed by neutralization of the oil with alkali.

The invention herein described is intended to include within its scope fatty oils containing fatty acyl radicals of carbon chain length of 10 to 22 carbons and having phosphorus acid groups on at least one acyl radical, in which at least one acid hydrogen of the phosphorus acid group is free to form a salt, and the carbon contiguous to the carbon to which the phosphorus acid group is attached contains a hydroxyl group. The method described herein is applicable to epoxy fatty acids, epoxy fatty alcohols or epoxy fatty esters as one of the reactants. The esters may be composed of monohydric alcohols such as methyl, ethyl, butyl alcohols, etc., or a polyhydric alcohol such as glycol and glycerol in which one or more of the fatty acyl radicals contain the phosphorated group. Fatty triglycerides obtained from natural sources which have application in the instant invention as the base material include tallow, grease, menhaden oil, soybean oil, linseed oil, etc. Also included is the complex mixture in sperm oil, which contains in addition to triglycerides, esters of long chain fatty acids and long chain fatty alcohols.

The phosphorus acids are polybasic acids and thus have, after esterification with the epoxidized oils, a reactive acid group. They include orthophosphoric, pyrophosphoric, thiophosphoric, tetraphosphoric, phosphorous, mono alkyl and mono aryl phosphoric and phosphonic acids. Thus the compositions of this invention are fatty acids and organic esters and salts thereof wherein at least one fatty acyl radical contains a hydroxyl and phosphorus acid ester group on contiguous carbons. The acyl radical would be characterized by the following grouping:

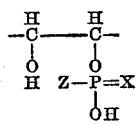

wherein X is from the group S and O and Z is —H, —OH, —OP=O(OH)$_2$, [—OP=O(OH)]$_3$OH; alkyloxy, aryloxy, alkyl, or aryl. Thus, the phosphorated oils contain a reactive hydrogen free to react with basic compositions such as the alkali metal hydroxides, alkaline earth metal hydroxides or oxides, or heavier metal hydroxides or oxides, ammonia, and simple amines such as methyl amine, butyl amine, trimethyl amine and mono-, di- or tri-ethanolamines or morpholine.

Another method of preparation of phosphorated oils is the reaction of an epoxidized triglyceride oil having an average epoxy equivalency of more than 1.33 epoxide groups per molecule with the polybasic phosphorus acid in substantially equivalent amounts. When the reactants are mixed rapidly, the mixture warms up spontaneously and solidifies. When the solid mixture is held at elevated temperatures for several days or allowed to set at room temperature for several months, a liquid product is obtained. This liquid product which is insoluble in water gives a completely water soluble product upon neutralization with alkali to a pH of about 7. This solution can be dried to give the solid alkali phosphorated product which may be redissolved in water if desired at a later date. The aqueous solutions have considerable surface activity.

While I do not intend to be limited thereby, it is my theory that the initial solid product in the above reaction is a polymer obtained through the reaction of the polybasic phosphorus acid and the epoxide. This product comprises alternating molecules of the oil and the polybasic acid. When the product stands for several months at room temperature or is held for several days at elevated temperatures, it is my belief that the polymer rearranges and/or hydrolyzes to a mono-phosphorated oil.

The product produced by the method first described wherein a mutual solvent was usually employed contains essentially one phosphorus acid group per epoxide group in the original oil. On the other hand, the product resulting from polymerization and hydrolysis is essentially a triglyceride containing about one phosphorus acid group per glyceride molecule. Hydrolysis of the polymer leaves di-hydroxy fatty acyl radicals on other of the glyceride acyl radicals. Taking tri-olein, for purposes of illustration of the mechanism of the reaction, epoxidation thereof produces essentially glyceryl tri-(9,10 epoxy) stearate. The reaction of glyceryl tri-(9,10 epoxy) stearate with orthophosphoric acid produces a polymer of the following configuration through esterification of the phosphoric acid and the epoxy triglyceride.

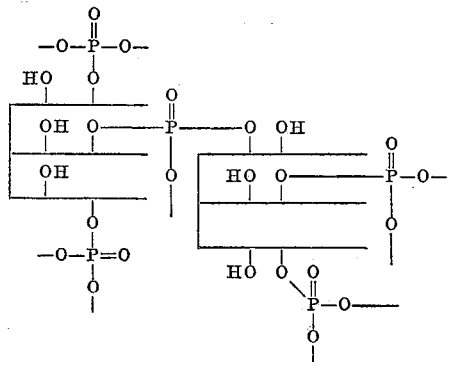

Upon hydrolysis, the product will have the following configuration,

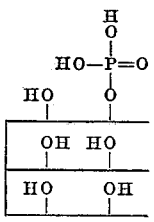

or the less hydrolyzed form,

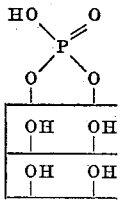

The following examples are provided to facilitate further understanding of the present invention and should not as such be construed as placing any limitation on the invention as defined in the appended claims.

*Example I*

388 grams of 85% phosphoric acid is dissolved in 1 liter of absolute ether. One thousand grams of epoxidized soybean oil (5% oxirane oxygen) is added to the solution slowly and with good stirring. Addition is slow enough so that the heat of reaction does not cause the ether to boil over. Toward the end of the reaction, the addition of oil is even slower than it is at the beginning to hold down the foam of the now viscous product. After all of the epoxidized oil is added, the product is placed on a steam bath, and the excess ether is boiled off. The viscous oil is insoluble in water, mineral oil and 85% phosphoric acid.

The phosphated oil is then reacted with 40% aqueous sodium hydroxide solution sufficient to bring the pH to about 7, and additional water is added to bring the total water content in the product to about 50%. This product in the liquid stage exhibits excellent surface activity. When dried, a solid product is obtained. In a similar reaction using dioxane as the solvent, the results obtained are similar with the exception that a higher temperature is necessary to boil off the dioxane, and some darkening of the product is obtained.

The phosphorous, pyrophosphoric, and tetraphosphoric acid esters are prepared by a similar procedure. The sodium salts are emulsifiers for oil and water systems.

*Example II*

To a solution of 18.8 grams of 85% phosphoric acid in 50 ml. of ether is added 100 grams of epoxidized tallow (2% oxirane oxygen) at a slow rate and with vigorous stirring. The ether is boiled off, and 40% sodium hydroxide is added to bring the pH to about 7.0. The product containing about 21% water weighs about 153 grams. Upon cooling to room temperature, the product is a solid. The solid product dissolves in a small amount of water to give a clear solution. When a large amount of water is used, however, a cloudy solution is obtained. It is quite soluble in mineral oil, particularly when a small amount of additional water is added. This phosphated tallow is a good emulsifying agent for water-oil systems.

*Example III*

One hundred grams of methyl 9,10 epoxy stearate (3.8% oxirane oxygen) is slowly added to a solution of 27.7 grams of 85% phosphoric acid in 50 ml. of ether. Sodium hydroxide is then added to bring the pH to about 7. The liquid product, the sodium salt of methylhydroxy, phosphato-stearate, was surface active in a manner similar to the product of Example II.

*Example IV*

One gram-mol of 85% orthophosphoric acid is dissolved in 500 cc. of tetrahydrofuran. The solution is heated to boiling; heat is removed; and 400 grams of epoxidized sperm oil (4.0% oxirane oxygen) is added dropwise at a slow rate. There is continued boiling due to the exothermic nature of the reaction. After all the epoxidized sperm oil is added, the solvent is distilled off. The product, a viscous oil, is neutralized to pH 7 with alkali. Upon drying, a neutral, water soluble solid having surface-active properties is obtained.

*Example V*

To 15.4 grams of monobutyl phosphoric acid is added slowly 26.7 grams of epoxidized soybean oil (6.0% oxirane oxygen). The exothermic reaction is complete in a few minutes after all of the oil is added. The mixture is held on a steam bath for one hour. The resulting viscous liquid is rendered water soluble by neutralization with 15 grams of triethanolamine.

The mono-aryl phosphoric acid and other homologous mono-alkyl phosphoric acid esters of the oils are prepared in a similar manner by reacting, for example, monocresyl or homologous alkyl phosphoric acids between ethyl and octadecyl, or monophenyl phosphoric acid, with an epoxidized oil. The same is true for phosphonic acids such as phenyl phosphonic acid.

Obviously, many modifications and variations of the invention as hereinbefore set forth may be made without departing from the spirit and scope thereof, and therefore only such limitations should be imposed as are indicated in the appended claims.

I claim:

1. A method which comprises esterifying of a polybasic phosphorus acid and an epoxy triglyceride oil having an average epoxy equivalency more than 1.33 epoxide groups per molecule to obtain a solid product and holding said product at temperatures above room temperature to obtain a liquid product having about one phosphorus acid ester group per molecule.

2. A method which comprises reacting a polybasic phosphorus acid and an epoxidized fatty oil having acyl radicals of a carbon chain length of 10-22 carbons and an expoxy content above about 2% oxirane oxygen in a solvent medium to produce a phosphorus acid ester of said fatty oils.

3. A method which comprises esterification in a mutual solvent of an epoxidized triglyceride oil having an oxirane content above about 2% oxirane oxygen and a polybasic phosphorus acid whereby at least one of the fatty acyl radicals of said triglyceride is esterified with said phosphorus acid and the carbon adjacent the phosphorus acid group is substituted with a hydroxyl group.

4. The method of claim 3 wherein the epoxidized triglyceride oil is epoxidized sperm oil.

5. The method of claim 3 wherein the epoxidized oil is epoxidized tallow.

6. The method of claim 3 wherein the epoxidized triglyceride oil is epoxidized soybean oil.

7. The method of claim 3 wherein the polybasic phosphorus acid is phosphoric acid.

8. The method of claim 3 wherein the polybasic phosphorus acid is a monoalkyl phosphoric acid.

References Cited in the file of this patent

UNITED STATES PATENTS

| | | |
|---|---|---|
| 2,345,734 | Dickey et al. | Apr. 4, 1944 |
| 2,386,250 | McNalley et al. | Oct. 9, 1945 |
| 2,466,393 | Dickey et al. | Apr. 5, 1949 |
| 2,490,748 | Dickey et al. | Dec. 6, 1949 |
| 2,723,971 | Cupery | Nov. 15, 1955 |
| 2,849,418 | Fang | Aug. 26, 1958 |